(12) United States Patent
Kim

(10) Patent No.: US 11,634,173 B2
(45) Date of Patent: Apr. 25, 2023

(54) APPARATUS AND METHOD FOR CONTROLLING STEER-BY-WIRE SYSTEM

(71) Applicant: HYUNDAI MOBIS Co., Ltd., Seoul (KR)

(72) Inventor: Woo Hyung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 324 days.

(21) Appl. No.: 17/134,452

(22) Filed: Dec. 27, 2020

(65) Prior Publication Data
US 2021/0354750 A1 Nov. 18, 2021

(30) Foreign Application Priority Data
May 12, 2020 (KR) .......................... 10-2020-0056552

(51) Int. Cl.
*B62D 6/00* (2006.01)
*B62D 5/04* (2006.01)
*B62D 5/00* (2006.01)

(52) U.S. Cl.
CPC ............. *B62D 6/008* (2013.01); *B62D 5/006* (2013.01); *B62D 5/0472* (2013.01)

(58) Field of Classification Search
CPC ...... B62D 6/008; B62D 5/006; B62D 5/0472; B62D 5/0469; B62D 5/0463; B62D 5/005; B62D 6/00
USPC .......................................................... 701/41
See application file for complete search history.

(56) References Cited

U.S. PATENT DOCUMENTS

| | | | |
|---|---|---|---|
| 10,214,234 B2* | 2/2019 | Kim | B62D 6/02 |
| 2005/0037884 A1* | 2/2005 | Hermann | B62D 5/0472 |
| | | | 475/18 |
| 2020/0062292 A1* | 2/2020 | Shin | B62D 5/0463 |
| 2020/0094873 A1* | 3/2020 | Hong | B62D 6/008 |

FOREIGN PATENT DOCUMENTS

| | | |
|---|---|---|
| JP | 2008-273226 | 11/2008 |
| JP | 2014-133521 | 7/2014 |
| JP | 5949949 | 7/2016 |
| KR | 10-0751684 | 8/2007 |
| KR | 10-2019-0066995 | 6/2016 |
| KR | 10-2018-0080401 | 7/2018 |
| KR | 10-2020-0023807 | 3/2020 |
| KR | 10-2020-0034406 | 3/2020 |

\* cited by examiner

*Primary Examiner* — Shardul D Patel
(74) *Attorney, Agent, or Firm* — H.C. Park & Associates, PLC

(57) ABSTRACT

A apparatus for controlling a steer-by-wire system including: a reaction torque generator configured to generate reaction torque as a calculated value of steering reaction torque applied to a steering wheel; a driver torque estimator configured to detect a driver torque estimation value as an estimated value of driver steering torque; a speed controller configured to generate a motor torque command value of a motor-driven power steering system; a torque adjuster configured to calibrate the motor torque command value and the reaction torque based on the driver torque estimation value, and output final active return torque and final reaction torque; and a target current generator configured to generate a target current for motor control by using the final active return torque and the final reaction torque, inputted from the torque adjuster, and input the generated target current to a motor.

20 Claims, 17 Drawing Sheets

APPARATUS AND METHOD FOR CONTROLLING STEER-BY-WIRE SYSTEM

CROSS-REFERENCE TO RELATED APPLICATION

This application claims priority from and the benefit of Korean Patent Application No. 10-2020-0056552, filed on May 12, 2020, which is hereby incorporated by reference for all purposes as if set forth herein.

BACKGROUND

Field

Exemplary embodiments of the present disclosure relate to an apparatus and method for controlling a steer-by-wire system, and more particularly, to an apparatus and method for controlling a steer-by-wire system, which can generate a target current for controlling a reaction force of a steering wheel, based on a rack force, a vehicle speed, a steering angular velocity and a steering angle in a steer-by-wire system.

Discussion of the Background

A steer-by-wire system refers to a steering system capable of removing mechanical connections between a steering wheel and wheels of a vehicle. The steer-by-wire system receives a rotation signal of the steering wheel through an ECU (Electronic Control Unit) and steers the vehicle by operating steering motors connected to the wheels, based on the received rotation signal.

Since the steer-by-wire system excludes a mechanical connection structure of an existing steering system, the steer-by-wire system can increase the degree of freedom in layout according to the structure of a steering system, improve fuel efficiency, and remove disturbances which are reversely inputted from the wheels.

The related art of the present disclosure is disclosed in Korean Patent Application 10-2019-0066995 published on Jun. 14, 2019 and entitled "Method for Generating Steering Reaction Force of Steer-By-Wire System".

The above information disclosed in this Background section is only for enhancement of understanding of the background of the invention and, therefore, it may contain information that does not constitute prior art.

SUMMARY

Exemplary embodiments are directed to an apparatus and method for controlling a steer-by-wire system, which can generate a target current for controlling a reaction force of a steering wheel, based on a rack force, a vehicle speed, a steering angular velocity, and a steering angle in a steer-by-wire system.

Additional features of the invention will be set forth in the description which follows, and in part will be apparent from the description, or may be learned by practice of the invention.

An exemplary embodiment of the present invention provides an apparatus for controlling a steer-by-wire system including: a reaction torque generator configured to generate reaction torque as a calculated value of steering reaction torque applied to a steering wheel; a driver torque estimator configured to detect a driver torque estimation value as an estimated value of driver steering torque; a speed controller configured to generate a motor torque command value of a motor-driven power steering system; a torque adjuster configured to calibrate the motor torque command value and the reaction torque based on the driver torque estimation value, and output final active return torque and final reaction torque; and a target current generator configured to generate a target current for motor control by using the final active return torque and the final reaction torque, inputted from the torque adjuster, and input the generated target current to a motor.

The reaction torque generator may generate the reaction torque by adding hysteresis torque based on a steering angular velocity of a steering wheel to reaction torque based on a rack force.

The reaction torque generator may include: a reaction torque decision unit configured to decide the reaction torque based on the rack force, based on a vehicle speed and a rack force estimation value of a steering system; a hysteresis torque decision unit configured to decide the hysteresis torque based on the steering angular velocity of the steering wheel; and a weight application unit configured to calculate the reaction torque by applying a weight to the reaction torque based on the rack force and the hysteresis torque.

The hysteresis torque decision unit may decide the hysteresis torque through a model which decides a hysteresis torque value based on the steering angular velocity.

The hysteresis torque decision unit may decide the model in consideration of the vehicle speed.

The weight application unit may decide a weight between the reaction torque based on the rack force and the hysteresis torque, according to the steering angular velocity.

The apparatus may further include an end-lock torque detector configured to detect end-lock torque, when the steering angle reaches an end stop of a steering wheel or a difference between the steering angle and a pinion angle is equal to or more than a preset angle, wherein the target current generator generates the target current for motor control by further using the end-lock torque.

The end-lock torque detector may detect the end-lock torque based on the steering angle or the rack force estimation value.

The end-lock torque detector may include: an end stop processing unit configured to acquire torque based on the steering angle from an end-stop torque map, when the steering angle reaches the end stop of the steering wheel; a curb processing unit configured to acquire torque based on the rack estimation value from a curb torque map, when the difference between the steering angle and the pinion angle is equal to or more than the preset angle; and an end-lock torque setting unit configured to set the torque, acquired by the end stop processing unit or the curb processing unit, as the end-lock torque.

The apparatus may further include a damping torque detector configured to detect damping torque using one or more of the vehicle speed, the steering angle and the steering angular velocity, wherein the target current generator generates the target current for motor control by further using the damping torque.

Another exemplary embodiment of the present invention provides an apparatus for controlling a steer-by-wire system including: a reaction torque generator configured to generate reaction torque as a calculated value of steering reaction torque applied to a steering wheel; a rack force estimator configured to estimate a rack force applied to a rack bar of a motor-driven motor steering system; a speed controller configured to generate a motor torque command value of the motor-driven power steering system; a torque adjuster configured to calibrate the motor torque command value and the reaction torque based on the rack force estimation value, and output final active return torque and final reaction torque; and a target current generator configured to generate a target current for motor control by using the final active return torque and the final reaction torque, inputted from the torque adjuster, and input the generated target current to a motor.

The reaction torque generator may generate the reaction torque by adding hysteresis torque based on a steering angular velocity of a steering wheel to reaction torque based on a rack force.

The reaction torque generator may include: a reaction torque decision unit configured to decide the reaction torque based on the rack force, based on a vehicle speed and a rack force estimation value of a steering system; a hysteresis torque decision unit configured to decide the hysteresis torque based on the steering angular velocity of the steering wheel; and a weight application unit configured to calculate the reaction torque by applying a weight to the reaction torque based on the rack force and the hysteresis torque.

The hysteresis torque decision unit may decide the hysteresis torque through a model which decides a hysteresis torque value based on the steering angular velocity.

The weight application unit may decide a weight between the reaction torque based on the rack force and the hysteresis torque, according to the steering angular velocity.

The apparatus may further include an end-lock torque detector configured to detect end-lock torque, when the steering angle reaches an end stop of a steering wheel or a difference between the steering angle and a pinion angle is equal to or more than a preset angle, wherein the target current generator generates the target current for motor control by further using the end-lock torque.

The end-lock torque detector may detect the end-lock torque based on the steering angle or the rack force estimation value.

The end-lock torque detector may include: an end stop processing unit configured to acquire torque based on the steering angle from an end-stop torque map, when the steering angle reaches the end stop of the steering wheel; a curb processing unit configured to acquire torque based on the rack estimation value from a curb torque map, when the difference between the steering angle and the pinion angle is equal to or more than the preset angle; and an end-lock torque setting unit configured to set the torque, acquired by the end stop processing unit or the curb processing unit, as the end-lock torque.

The apparatus may further include a damping torque detector configured to detect damping torque using one or more of the vehicle speed, the steering angle and the steering angular velocity, wherein the target current generator generates the target current for motor control by further using the damping torque.

Another exemplary embodiment of the present invention provides a method for controlling a steer-by-wire system including: generating reaction torque as a calculated value of steering reaction torque applied to a steering wheel; detecting a driver torque estimation value as an estimated value of driver steering torque, or estimating a rack force applied to a rack bar of a motor-driven power steering system; generating a motor torque command value of the motor-driven power steering system; calibrating the motor torque command value and the reaction torque based on the driver torque estimation value or the rack force estimation value, and outputting final active return torque and final reaction torque; and generating a target current for motor control by using the final active return torque and the final reaction torque, and inputting the generated target current to a motor.

The generating of the reaction torque may include generating the reaction torque by adding hysteresis torque based on a steering angular velocity of a steering wheel to reaction torque based on a rack force.

The generating of the reaction torque may include: deciding the reaction torque based on the rack force, based on a vehicle speed and a rack force estimation value of a steering system; deciding the hysteresis torque based on the steering angular velocity of the steering wheel; and calculating the reaction torque by applying a weight to the reaction torque based on the rack force and the hysteresis torque.

The deciding of the hysteresis torque may include deciding the hysteresis torque through a model which decides a hysteresis torque value based on the steering angular velocity.

The deciding of the hysteresis torque may include deciding the model by considering the vehicle speed.

The calculating of the reaction torque may include deciding a weight between the reaction torque based on the rack force and the hysteresis torque, according to the steering angular velocity.

The method may further include detecting end-lock torque, when the steering angle reaches an end stop of a steering wheel or a difference between the steering angle and a pinion angle is equal to or more than a preset angle. The generating of the target current for motor control may include generating the target current for motor control by further using the end-lock torque.

The detecting of the end-lock torque may include detecting the end-lock torque based on the steering angle or the rack force estimation value.

The detecting of the end-lock torque may include acquiring torque based on the steering angle from an end-stop torque map, when the steering angle reaches the end stop of the steering wheel; acquiring torque based on the rack estimation value from a curb torque map, when the difference between the steering angle and the pinion angle is equal to or more than the preset angle; and setting, as the end-lock torque, the torque based on the steering angle or the torque based on the rack force estimation value.

The method may further include detecting damping torque using one or more of the vehicle speed, the steering angle, and the steering angular velocity. The generating of the target current for motor control may include generating the target current for motor control by further using the damping torque.

Another exemplary embodiment of the present invention provides a method for controlling a steer-by-wire system including: generating reaction torque as a calculated value of steering reaction torque applied to a steering wheel; estimating a rack force applied to a rack bar of a motor-driven motor steering system; generating a motor torque command value of the motor-driven power steering system; calibrating the motor torque command value and the reaction torque based on the rack force estimation value, and outputting final active return torque and final reaction torque; and generating a target current for motor control by using the final active return torque and the final reaction torque, and inputting the generated target current to a motor.

The generating of the reaction torque may include generating the reaction torque by adding hysteresis torque based on a steering angular velocity of a steering wheel to reaction torque based on a rack force.

The generating of the reaction torque may include: deciding the reaction torque based on the rack force, based on a vehicle speed and a rack force estimation value of a steering system; deciding the hysteresis torque based on the steering angular velocity of the steering wheel; and calculating the reaction torque by applying a weight to the reaction torque based on the rack force and the hysteresis torque.

The deciding of the hysteresis torque may include deciding the hysteresis torque through a model which decides a hysteresis torque value based on the steering angular velocity.

The deciding of the hysteresis torque may include deciding the model by considering the vehicle speed.

The calculating of the reaction torque may include deciding a weight between the reaction torque based on the rack force and the hysteresis torque, according to the steering angular velocity.

The method may further include detecting end-lock torque, when the steering angle reaches an end stop of a steering wheel or a difference between the steering angle and a pinion angle is equal to or more than a preset angle. The generating of the target current for motor control may include generating the target current for motor control by further using the end-lock torque.

The detecting of the end-lock torque may include detecting the end-lock torque based on the steering angle or the rack force estimation value.

The detecting of the end-lock torque may include: acquiring torque based on the steering angle from an end-stop torque map, when the steering angle reaches the end stop of the steering wheel; acquiring torque based on the rack estimation value from a curb torque map, when the difference between the steering angle and the pinion angle is equal to or more than the preset angle; and setting, as the end-lock torque, the torque based on the steering angle or the torque based on the rack force estimation value.

The method may further include detecting damping torque using one or more of the vehicle speed, the steering angle, and the steering angular velocity. The generating of the target current for motor control may include generating the target current for motor control by further using the damping torque.

In accordance with the embodiments of the present disclosure, the apparatus and method for controlling a steering-by-wire system can estimate the driver torque or rack force, and control active return of the steering wheel by using the estimated driver torque or rack force, thereby improving a driver's steering feel.

Furthermore, the apparatus and method can perform active return control even without a torque sensor or torsion bar, thereby reducing the manufacturing cost of the steer-by-wire system.

Furthermore, the apparatus and method can calculate the reaction torque by adding the hysteresis torque based on the steering angular velocity of the steering wheel to the reaction torque based on the rack force, thereby improving a driver's steering feel.

Furthermore, the apparatus and method can provide a stop-end reaction feel when the steering angle reaches an end stop of the steering wheel, thereby preventing a driver from operating the steering wheel beyond the end stop of the steering wheel in the steer-by-wire steering system.

Furthermore, the apparatus and method can provide a reaction feel when the vehicle bumps against a curb. Thus, a reaction force device and a front wheel steering system may be mechanically separated from each other, which makes it possible to improve a driver steering feel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Hereinafter, an apparatus and method for controlling a steer-by-wire system will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example.

Figure 1:
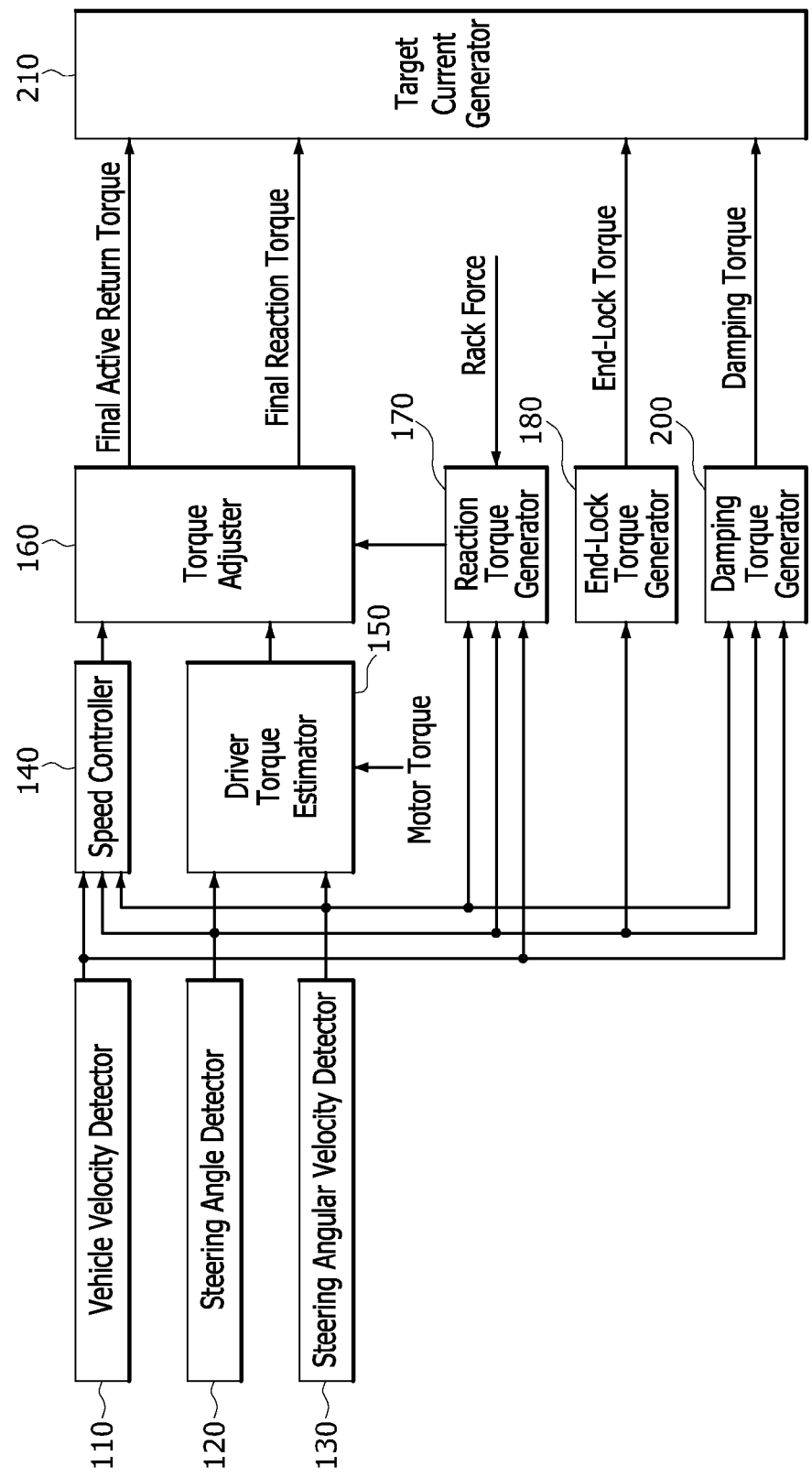
FIG. 1 is a block configuration diagram illustrating an apparatus for controlling a steer-by-wire system in accordance with an embodiment of the present disclosure.
Figure 2:
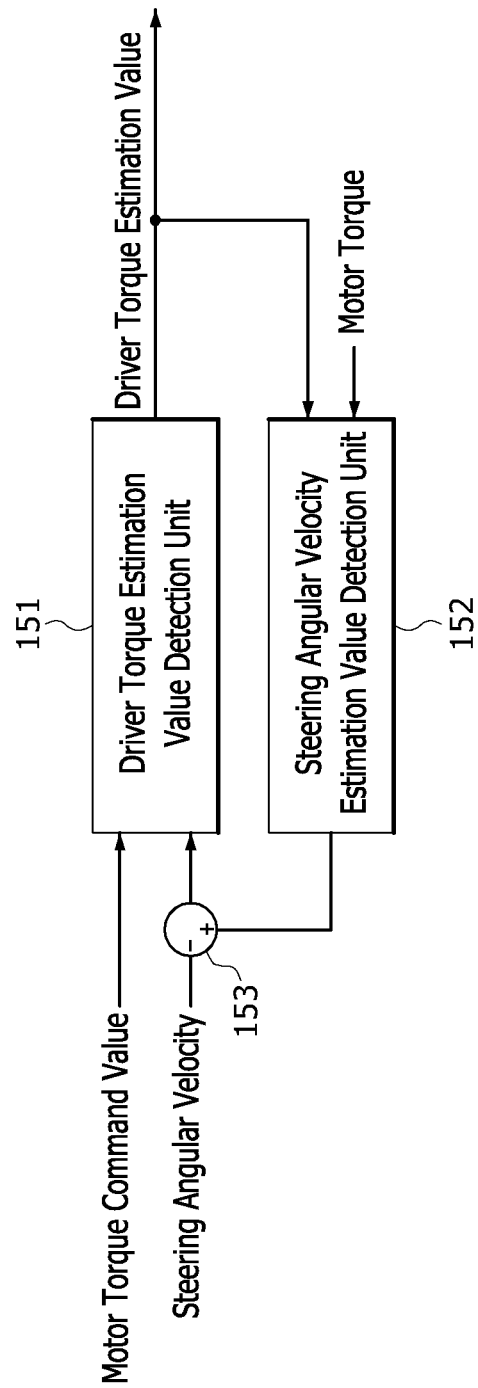
FIG. 2 is a block configuration diagram illustrating a driver torque estimator in accordance with the embodiment of the present disclosure.
Figure 3:
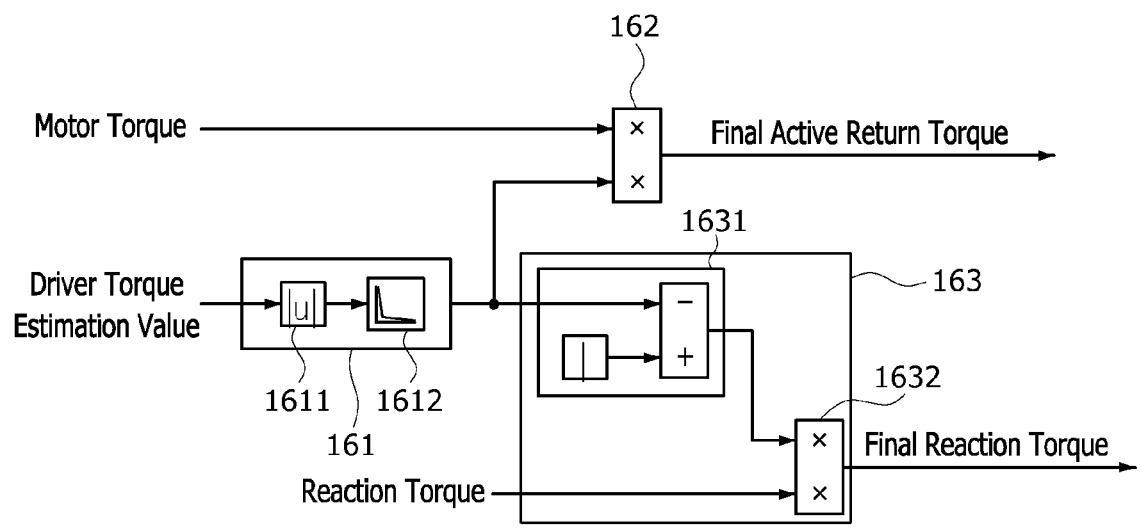
FIG. 3 is a block configuration diagram illustrating a torque adjuster in accordance with the embodiment of the present disclosure.

FIG. 1 is a block configuration diagram illustrating an apparatus for controlling a steer-by-wire system in accordance with an embodiment of the present disclosure, FIG. 2 is a block configuration diagram illustrating a driver torque estimator in accordance with the embodiment of the present disclosure, and FIG. 3 is a block configuration diagram illustrating a torque adjuster in accordance with the embodiment of the present disclosure.

Referring to FIG. 1, the steer-by-wire system control apparatus in accordance with the embodiment of the present disclosure includes a vehicle speed detector 110, a steering angle detector 120, a steering angular velocity detector 130, a speed controller 140, a driver torque estimator 150, a torque adjuster 160, a reaction torque generator 170, an end-lock torque detector 180, a damping torque detector 200 and a target current generator 210.

The vehicle speed detector 110 detects a vehicle speed. As the vehicle speed detector 110, a navigation system or a sensor for sensing the wheel speed of a vehicle may be adopted. In addition, the vehicle speed detector 110 may receive the vehicle speed through CAN communication inside the vehicle.

The steering angle detector 120 detects a steering angle of a steering wheel.

The steering angular velocity detector 130 detects a steering angular velocity of the steering wheel. The steering angular velocity detector 130 may be a sensor for sensing the steering angular velocity of the steering wheel. However, the steering angular velocity detector 130 may detect a steering angular velocity by differentiating the steering angle detected by the steering angle detector 120 without a separate sensor.

The speed controller 140 generates a motor torque command value of a motor-driven power steering system, using the vehicle speed detected by the vehicle speed detector 110 and the steering angle detected by the steering angle detector 120.

That is, in order to generate the steering angular velocity command value using the vehicle speed detected by the vehicle speed detector 110 and the steering angle detected by the steering angle detector 120, the speed controller 140 may include an active return tuning table which is stored therein in advance and configured to store a steering angular velocity command value matched with the vehicle speed and the steering angle, and detect a steering angular velocity command value, mapped to a current steering angle and vehicle speed, from the active return tuning table.

The speed controller 140 receives the steering angular velocity from the steering angular velocity detector 130. As described above, the speed controller 140 generates a motor torque command value based on a difference between the detected steering angular velocity command value and the steering angular velocity detected by the steering angular velocity detector 130, and then inputs the generated motor torque command value to the torque adjuster 160.

The driver torque estimator 150 detects a driver torque estimation value using the steering angle, the steering angular velocity and motor torque.

Referring to FIG. 2, the driver torque estimator 150 includes a steering angular velocity estimation value detection unit 152, a steering angular velocity difference detection unit 153 and a driver torque estimation value detection unit 151.

The steering angular velocity estimation value detection unit 152 detects a steering angular velocity estimation value using the motor torque and the driver torque estimation value. In this case, the steering angular velocity estimation value detection unit 152 may detect a steering angular velocity estimation value by applying the driver torque estimation value and the motor torque to a Kalman filter.

The steering angular velocity estimation value detection unit 152 may receive the driver torque estimation value from the driver torque estimation value detection unit 151, and receive the motor torque from another sensor, controller or device of the steer-by-wire system.

The steering angular velocity difference detection unit 153 detects a difference between the steering angular velocity detected by the steering angular velocity detector 130 and the steering angular velocity estimation value detected by the steering angular velocity estimation value detection unit 152, and inputs the detected difference to the driver torque estimation value detection unit 151. That is, the steering angular velocity difference detection unit 153 detects a difference between an actual steering angular velocity (the steering angular velocity detected by the steering angular velocity detector 130) and the steering angular velocity estimation value (the steering angular velocity estimated by the steering angular velocity estimation value detection unit 152), and inputs the detected steering angular velocity difference to the driver torque estimation value detection unit 151.

The driver torque estimation value detection unit 151 detects the driver torque estimation value using the steering angle detected by the steering angle detector 120 and the steering angular velocity difference received from the steering angular velocity difference detection unit 153.

That is, the driver torque estimation value detection unit 151 receives the steering angle and the steering angular velocity difference, detects the driver torque estimation value, and outputs the detected driver torque estimation value.

At this time, the steering angular velocity estimation value detection unit 152 receives the driver torque estimation value outputted from the driver torque estimation value detection unit 151, and receives the motor torque from another sensor, controller or device of the steer-by-wire system. Then, the steering angular velocity estimation value detection unit 152 generates the steering angular velocity estimation value by applying the driver torque estimation value and the motor torque to the Kalman filter, and inputs the generated steering angular velocity estimation value to the steering angular velocity difference detection unit 153.

The steering angular velocity difference detection unit 153 detects a difference between the steering angular velocity detected by the steering angular velocity detector 130 and the steering angular velocity estimation value detected by the steering angular velocity estimation value detection unit 152, and inputs the detected steering angular velocity difference to the driver torque estimation value detection unit 151.

Such a process is continuously repeated.

The driver torque estimation value outputted from the driver torque estimation value detection unit 151 is inputted to the torque adjuster 160.

The torque adjuster 160 calibrates the motor torque command value inputted from the speed controller 140 and reaction torque inputted from the reaction torque generator 170, based on the driver torque estimation value, and outputs final active return torque and final reaction torque.

Referring to FIG. 3, the torque adjuster 160 includes a decoupling gain detection unit 161, an active return torque adjusting unit 162 and a reaction torque adjusting unit 163.

The decoupling gain detection unit 161 detects a decoupling gain using the driver torque estimation value inputted from the driver torque estimation value detection unit 151. The decoupling gain detection unit 161 includes an absolute value detection part 1611 and a decoupling gain extraction part 1612.

The absolute value detection part 1611 detects the absolute value of the driver torque estimation value.

The decoupling gain extraction part 1612 extracts a decoupling gain corresponding to the absolute value of the driver torque estimation value, detected by the absolute value detection part 1611, from a preset lookup table.

The active return torque adjusting unit 162 generates the final active return torque by applying the decoupling gain, detected by the decoupling gain detection unit 161, to the motor torque command value inputted from the speed controller 140, and outputs the generated final active return torque.

That is, the active return torque adjusting unit 162 generates the final active return torque by multiplying the decoupling gain by the input motor torque command value, and outputs the generated final active return torque.

The reaction torque adjusting unit 163 adjusts the final reaction torque by applying the decoupling gain detected by the decoupling gain detection unit 161 to the reaction torque.

The reaction torque serves to provide a proper steering feel to a driver through rotation in a direction opposite to the rotation direction of the steering wheel. In some embodiments, such reaction torque may be received from a reaction force motor (not illustrated) which provides a reaction force according to rotation of the steering wheel, in a steer-by-wire system which steers a front wheel using a controller and a motor according to an input of a sensor, without a mechanical connection such as a universal joint between the steering wheel and a front wheel steering system.

Alternatively, as described below, such reaction torque may be received from the reaction torque generator 170.

The reaction torque adjusting unit 163 includes a decoupling gain calibration value generation part 1631 and a reaction torque generation part 1632.

The decoupling gain calibration value generation part 1631 generates a decoupling gain calibration value by subtracting the decoupling gain detected by the decoupling gain detection unit 161 from a preset reference gain. The reference gain is set to 1. Therefore, the decoupling gain calibration value generation part 1631 generates the decoupling gain calibration value by subtracting the decoupling gain of 0 to 1 from the reference gain of 1.

The reaction torque generation part 1632 generates the final reaction torque by applying the decoupling gain calibration value, generated by the decoupling gain calibration value generation part 1631, to the reaction torque received from the reaction torque generator 170. That is, the reaction torque generation part 1632 adjusts the reaction torque by multiplying the decoupling gain calibration value by the reaction torque received from the reaction torque generator 170, and provides a proper steering feel to a driver through the reaction torque.

That is, the torque adjuster 160 outputs the active return torque to return the steering wheel to the center. During this process, the torque adjuster 160 outputs proper reaction torque and thus provides a proper reaction force to the driver while returning the steering wheel to the center.

In the first embodiment, it has been described that the apparatus for controlling a steer-by-wire system generates the driver torque estimation value, and generates the active return torque and the reaction torque based on the driver torque estimation value. However, the apparatus may use a rack force estimation value as well as the drive torque estimation value. The rack force estimation value will be described with reference to a second embodiment.

Figure 4:
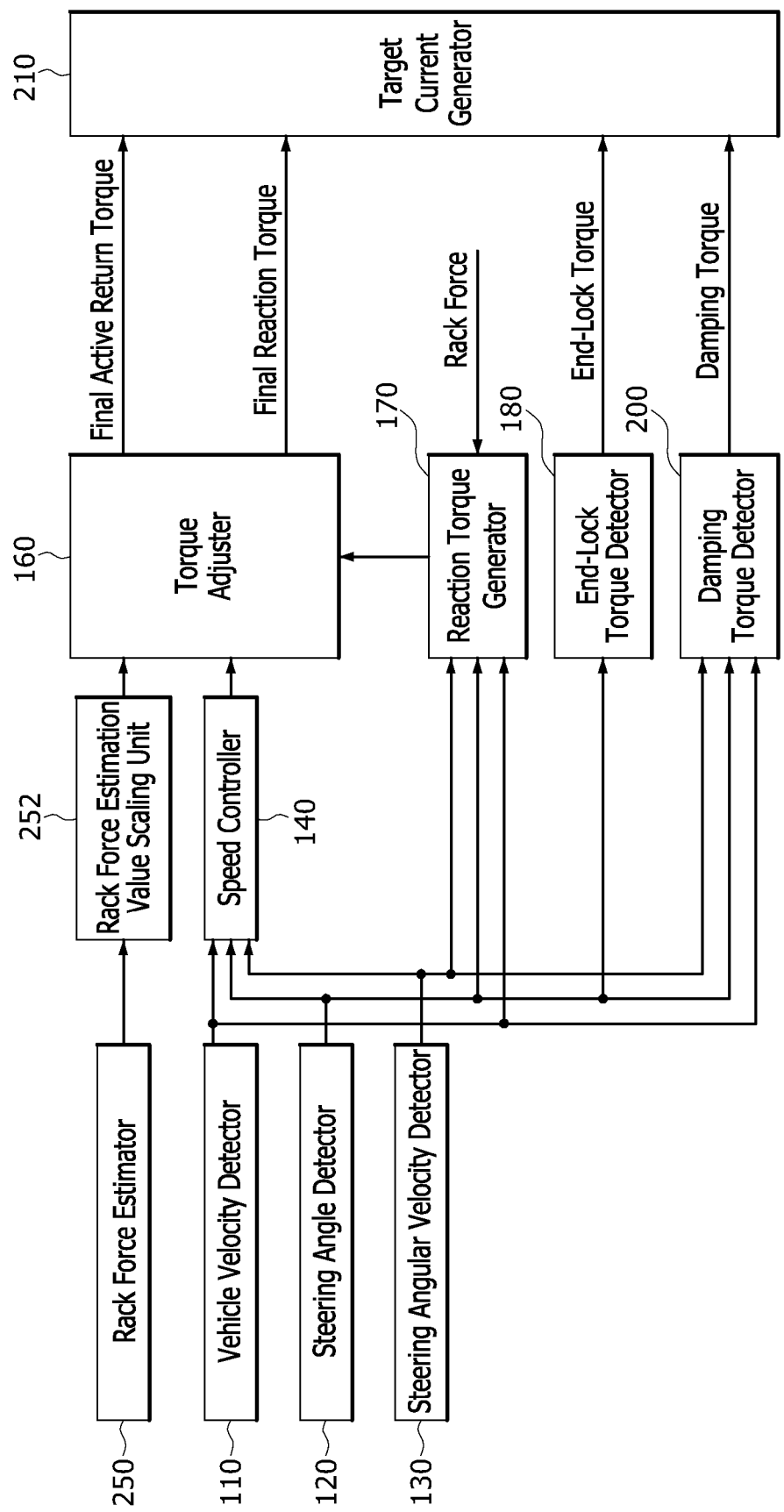
FIG. 4 is a block configuration diagram illustrating an apparatus for controlling a steer-by-wire system in accordance with another embodiment of the present disclosure.
Figure 5:
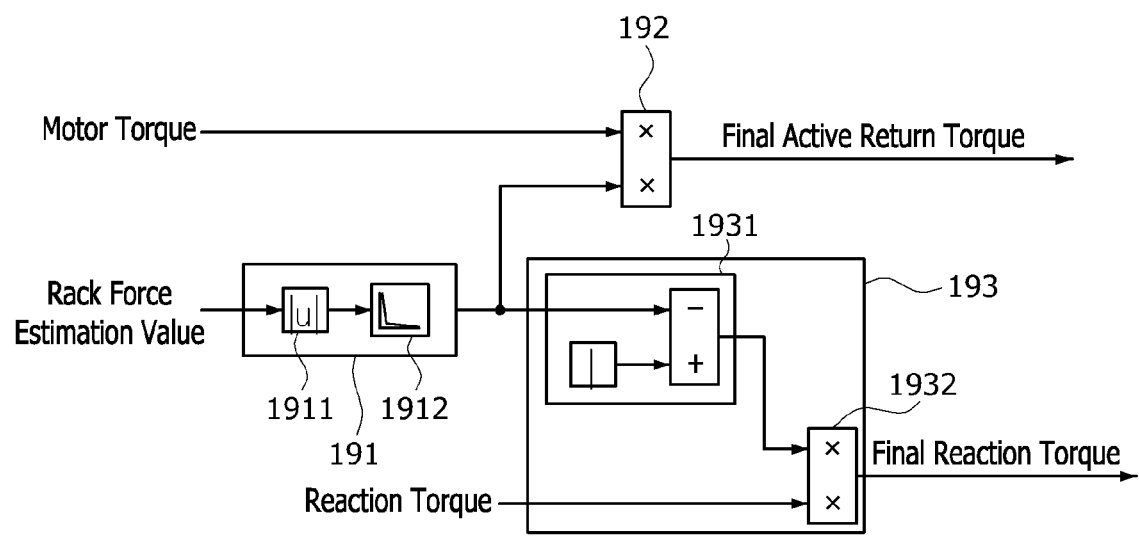
FIG. 5 is a block configuration diagram illustrating the apparatus for controlling a steer-by-wire system in accordance with another embodiment of the present disclosure.

FIG. 4 is a block configuration diagram illustrating an apparatus for controlling a steer-by-wire system in accordance with another embodiment of the present disclosure, and FIG. 5 is a block configuration diagram illustrating the apparatus for controlling a steer-by-wire system in accordance with the another embodiment of the present disclosure.

Referring to FIG. 4, the apparatus for controlling a steer-by-wire system in accordance with the another embodiment of the present disclosure includes a vehicle speed detector 110, a steering angle detector 120, a steering angular velocity detector 130, a speed controller 140, a rack force estimator 250, a rack force estimation value scaling unit 252 and a torque adjuster 190.

For reference, in the second embodiment, the same components as those of the above-described embodiment will be represented by like reference numerals, and the detailed descriptions thereof will be omitted herein.

The rack force estimator 250 estimates a rack force of a rack of a motor-driven power steering system.

The rack force estimator 250 estimates the rack force by applying a state value and the like of the vehicle, detected as vehicle state information by various sensors, to a predefined rack force estimation model. The method for estimating a rack force is not limited to the above-described embodiment, but obvious to those skilled in the art. Thus, in the present embodiment, the detailed descriptions thereof will be omitted herein.

The rack force estimation value scaling unit 252 scales the rack force estimation value estimated by the rack force estimator 250 according to driver torque, and inputs the scaled rack force estimation value to the torque adjuster 190. Typically, the rack force has a very similar profile to the driver torque, but has a different magnitude from the driver torque. Therefore, the rack force estimation value scaling unit 252 scales the rack force to correspond to the profile and magnitude of the driver torque. Thus, the rack force may be scaled in a very similar manner to the driver torque.

The torque adjuster 190 includes a decoupling gain detection unit 191, an active return torque adjusting unit 192 and a reaction torque adjusting unit 193.

The decoupling gain detection unit 191 detects a decoupling gain using the rack force estimation value inputted from the rack force estimation value scaling unit 252. The decoupling gain detection unit 191 includes an absolute value detection part 1911 and a decoupling gain extraction part 1912.

The absolute value detection part 1911 detects the absolute value of the rack force estimation value.

The decoupling gain extraction part 1912 extracts a decoupling gain, corresponding to the absolute value of the rack force estimation value detected by the absolute value detection part 1911, from a preset lookup table.

The active return torque adjusting unit 192 generates active return torque by applying the decoupling gain, detected by the decoupling gain detection unit 191, to the motor torque command value inputted from the speed controller 140, and outputs the generated active return torque as final active return torque.

That is, the active return torque adjusting unit 192 generates the final active return torque by multiplying the decoupling gain by the input motor torque command value, and outputs the generated final active return torque.

The reaction torque adjusting unit 193 adjusts final reaction torque by applying the decoupling gain, detected by the decoupling gain detection unit 191, to the reaction torque received from the reaction torque generator 170.

The reaction torque adjusting unit 193 includes a decoupling gain calibration value generation part 1931 and a reaction torque generation part 1932.

The decoupling gain calibration value generation part 1931 generates a decoupling gain calibration value by subtracting the decoupling gain detected by the decoupling gain detection unit 191 from a preset reference gain. The reference gain is set to 1. Therefore, the decoupling gain calibration value generation part 1931 generates the decoupling gain calibration value by subtracting the decoupling gain of 0 to 1 from the reference gain of 1.

The reaction torque generation part 1932 generates final reaction torque by applying the decoupling gain calibration value, generated by the decoupling gain calibration value generation part 1931, to the reaction torque received from the reaction torque generator 170. That is, the reaction torque generation part 1932 adjusts the reaction torque by multiplying the decoupling gain calibration value by the reaction torque, and provides a proper steering feel to a driver through the reaction torque.

That is, the torque adjuster 190 outputs the active return torque to return the steering wheel to the center. During this process, the torque adjuster 190 outputs proper reaction torque and thus provides a proper reaction force to the driver even while returning the steering wheel to the center.

Figure 6:
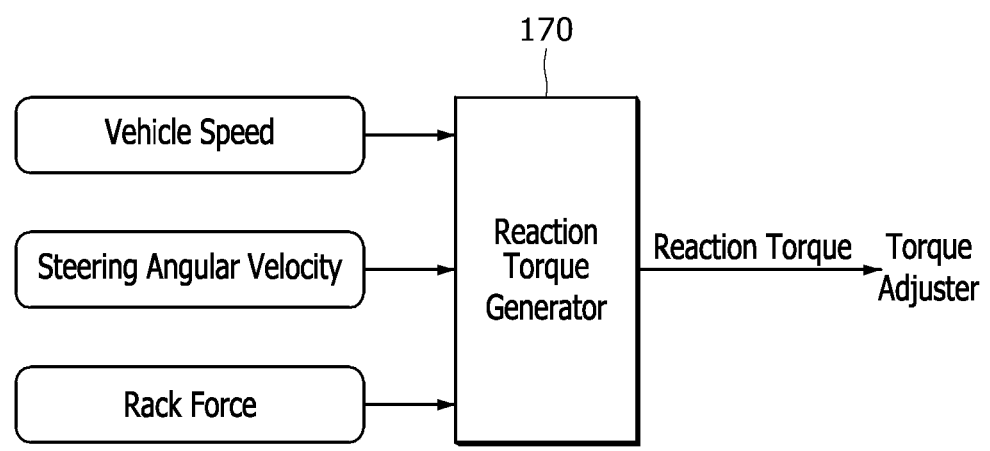
FIG. 6 is a block configuration diagram illustrating a reaction torque generator in accordance with the embodiment of the present disclosure.

FIG. 6 is a block configuration diagram illustrating the reaction torque generator in accordance with the embodiment of the present disclosure.

FIG. 6 illustrates a configuration of a steering wheel reaction force control apparatus in accordance with an embodiment of the present disclosure.

As illustrated in FIG. 6, the reaction torque generator 170 in the steering wheel reaction force control apparatus may generate reaction torque using a vehicle speed, a steering angular velocity and a rack force. The reaction torque may be a value obtained by calculating steering reaction torque applied to the steering wheel.

Such reaction torque may be used as a control parameter for controlling a current of a motor which provides a reaction force to a driver. In this case, the reaction torque itself may be used to control the motor, or the reaction torque and a torque factor such as damping torque, other than the reaction torque, may be combined to control the motor.

The detailed configuration of the reaction torque generator 170, which will be described, may include circuits, logical elements and the like or be implemented as logic included in a control unit including the circuits, the logic elements and the like or may include a combination of such configurations.

Figure 7:
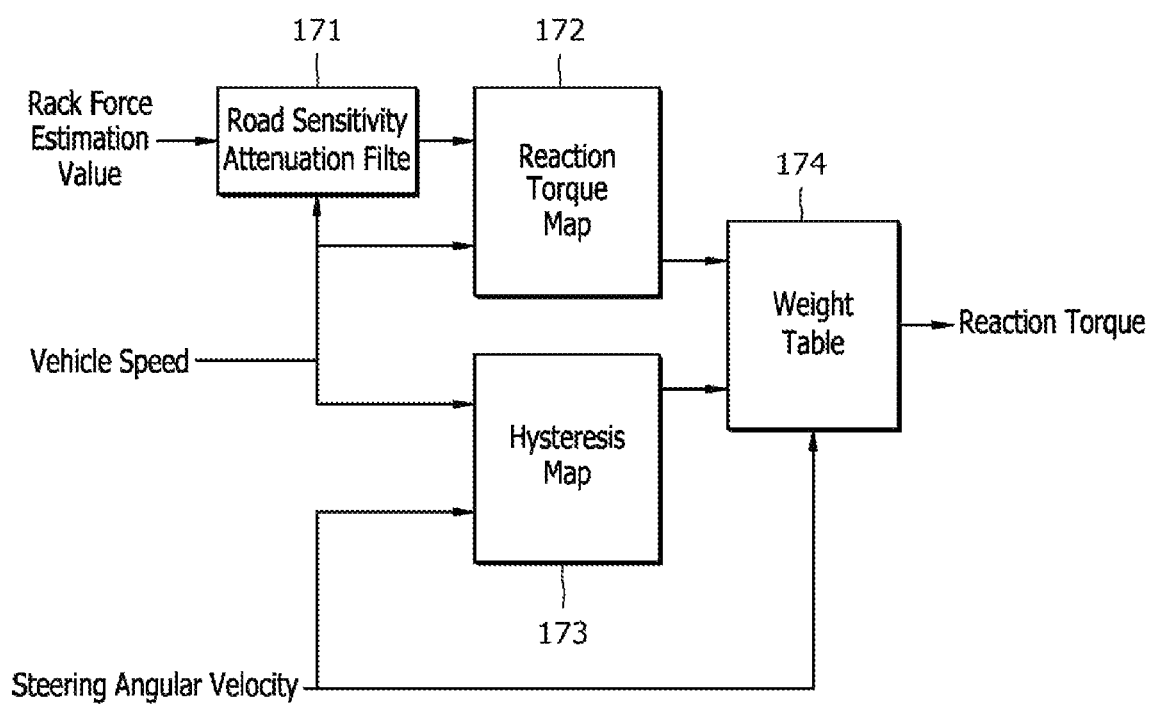
FIG. 7 is a diagram illustrating a specific configuration of the reaction torque generator in accordance with the embodiment of the present disclosure.

FIG. 7 is a diagram illustrating a specific configuration of the reaction torque generator in accordance with the embodiment of the present disclosure.

As illustrated in FIG. 7, the reaction torque generator 170 may include a road sensitivity attenuation filter 171, a reaction torque map 172, a hysteresis map 173 and a weight table 174.

The road sensitivity attenuation filter 171 may be referred to as a filter unit, the reaction torque map 172 may be referred to as a reaction torque decision unit, the hysteresis map 173 may be referred to as a hysteresis torque decision unit, and the weight table 174 may be referred to as a weight application unit.

The road sensitivity attenuation filter 171 may filter the rack force estimation value outputted from the rack force estimator 250, and output the filtered rack force estimation value to the reaction torque map 172. At this time, the road sensitivity attenuation filter 171 may receive the vehicle speed outputted from the vehicle speed detector 110, and filter the received vehicle speed.

Figure 8:
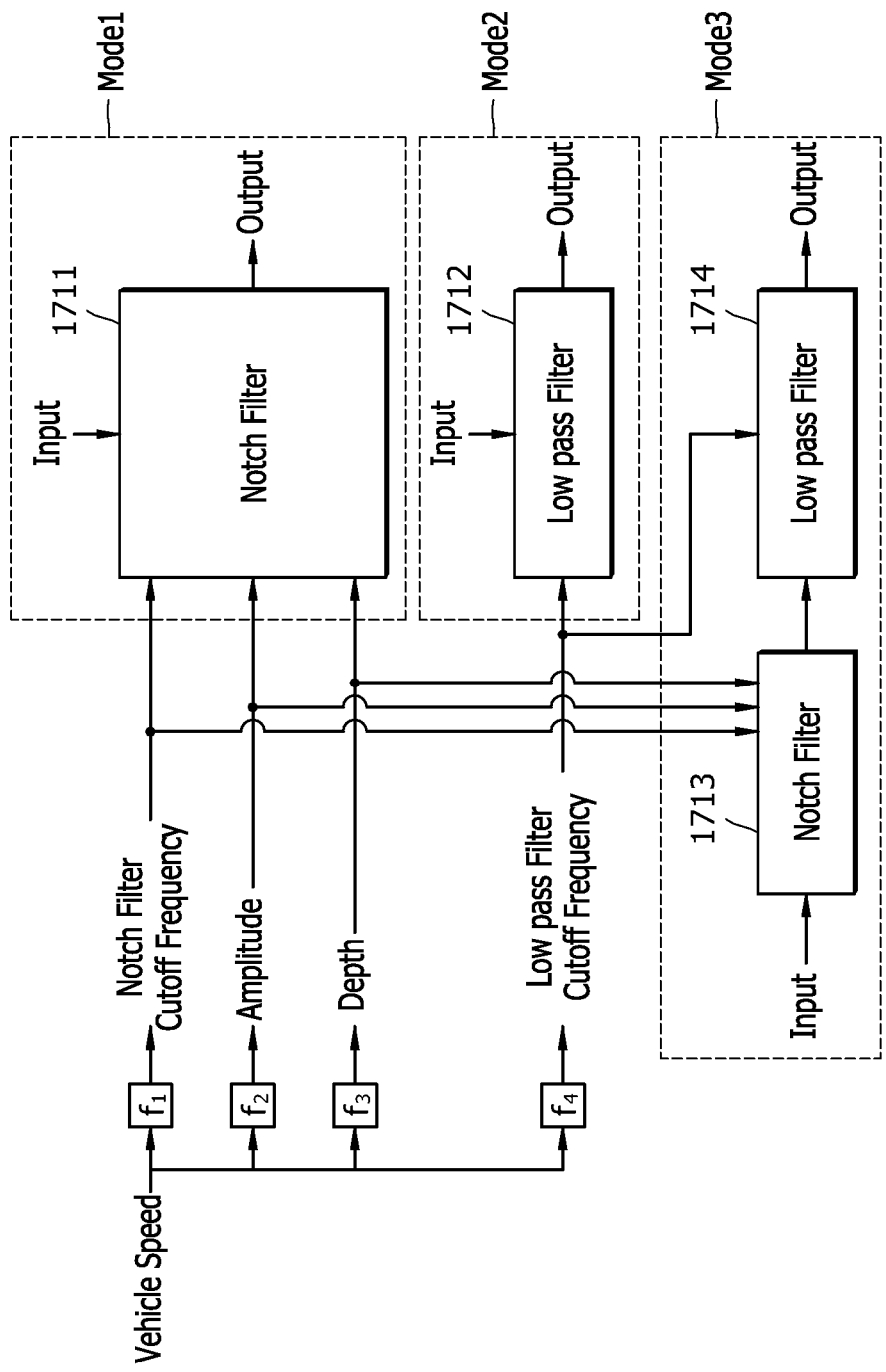
FIG. 8 is a diagram for describing a road sensitivity attenuation filter of the reaction torque generator in accordance with the embodiment of the present disclosure.

FIG. 8 is a diagram for describing the road sensitivity attenuation filter of the reaction torque generator in accordance with the embodiment of the present disclosure.

Referring to FIG. 8, the road sensitivity attenuation filter 171 will be described in more detail as follows.

As illustrated in FIG. 8, the road sensitivity attenuation filter 171 may include notch filters 1711 and 1713 and low pass filters 1712 and 1714.

The notch filters 1711 and 1713 may adjust rack force vibration depending on a mechanism or a specific frequency of vibration, and the low pass filters 1712 and 1714 may adjust the sensitivity of the rack force.

Such a filtering operation may adjust the sensitivity of response to the road in the rack force estimation value outputted from the rack force estimator 250.

The notch filters 1711 and 1713 have control parameters such as a cutoff frequency fc, an amplitude and a depth. The amplitude indicates the width of a filtered frequency, and the depth indicates a decrease of a filtering gain.

The cutoff frequency fc, the amplitude and the depth may be all decided according to the vehicle speed, and the values of the cutoff frequency fc, the amplitude and the depth according to each vehicle speed may be stored in the form of predetermined equations or tables.

The cutoff frequency may be used as a control parameter of the low pass filters 1712 and 1714. The cutoff frequencies of the low pass filters 1712 and 1714 may also be decided according to the vehicle speed, and the value of the cutoff frequency according to each vehicle speed may be stored in the form of a predetermined equation or table.

As illustrated in FIG. 8, the road sensitivity attenuation filter 171 may be operated in three kinds of modes. The modes may be divided into a mode for filtering a rack force estimation value (input value) by using only the notch filter 1711 (mode 1), a mode for filtering the rack force estimation value by using only the low pass filter 1712 (mode 2), and a mode for filtering the rack force estimation value by using the notch filter 1713 and the low pass filter 1714 (mode 3). Such modes may be selected by a user. According to the selected mode, the adjusting of the rack force vibration depending on a mechanism or the specific frequency of vibration and the adjusting of the sensitivity may be selectively applied.

The reaction torque map 172 may receive the filtered rack force estimation value, and output reaction torque according to the rack force.

Such reaction torque is decided according to the vehicle speed as well as the rack force. For example, a reaction torque value according to each vehicle speed and rack force may be stored in the form of a predetermined equation or table. The reaction torque map 172 may read a value of the table according to the input rack force estimation value and vehicle speed, or decide the reaction torque according to the rack force through an equation.

The hysteresis map 173 may decide hysteresis torque according to the steering angular velocity, and output the decided hysteresis torque.

In the case of the above-described reaction torque according to the rack force, the rack force estimation value received through CAN communication or the like is used as a control input. Thus, a time delay occurs in the rack force which is received according to an input of the steering angle. When such a time delay occurs, vibration may be generated. In the present embodiment, the hysteresis torque may be applied in advance to prevent the delay.

Figure 9:
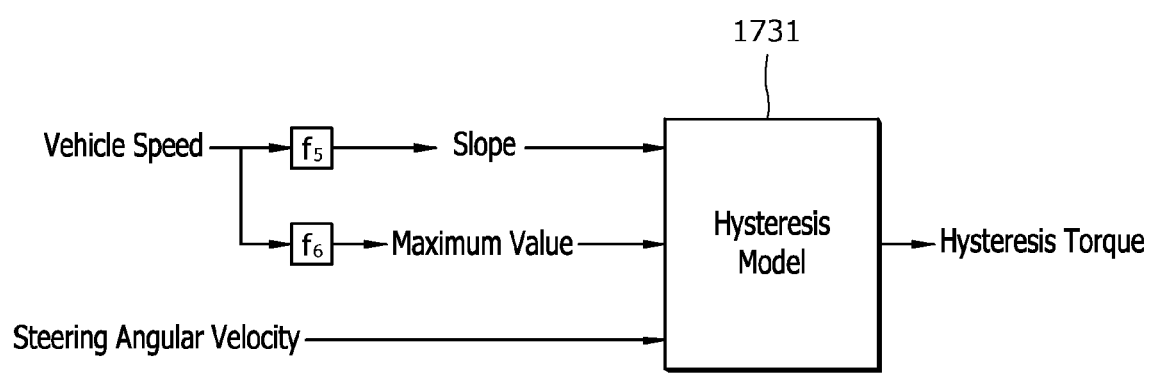
FIG. 9 is a diagram for describing a hysteresis map of the reaction torque generator in accordance with the embodiment of the present disclosure.

FIG. 9 is a diagram for describing the hysteresis map of the reaction torque generator in accordance with the embodiment of the present disclosure.

Referring to FIG. 9, the hysteresis map 173 will be described in more detail as follows.

The hysteresis map 173 is configured to decide hysteresis torque according to the steering angular velocity, and the hysteresis torque is decided by a hysteresis model 1731.

The hysteresis model 1731 for deciding a hysteresis torque value according to a steering angular velocity may include a plurality of graphs, and one of the graphs may be used to calculate the hysteresis torque value.

At this time, the graphs used in the hysteresis model 1731 may be decided according to the slopes of the graphs and the maximum hysteresis value, which are used as parameters. As illustrated in FIG. 9, the slopes and the maximum hysteresis value may be decided according to the vehicle speed.

That is, the slope and maximum value of the hysteresis model 1731 according to each vehicle speed may be stored in the form of a predetermined equation or table.

When such hysteresis torque is applied, the vehicle can be precisely steered according to the vehicle speed in an on-center section of the vehicle, and the slope of starting torque can be varied according to the vehicle speed.

Finally, the reaction torque may be calculated through the weight table 174 which decides the weights of the decided reaction torque and hysteresis torque.

As a control parameter of the weight table 174, a steering angular velocity may be applied. According to the steering angular velocity, a weight between the reaction torque and the hysteresis torque may be decided.

Figure 10:
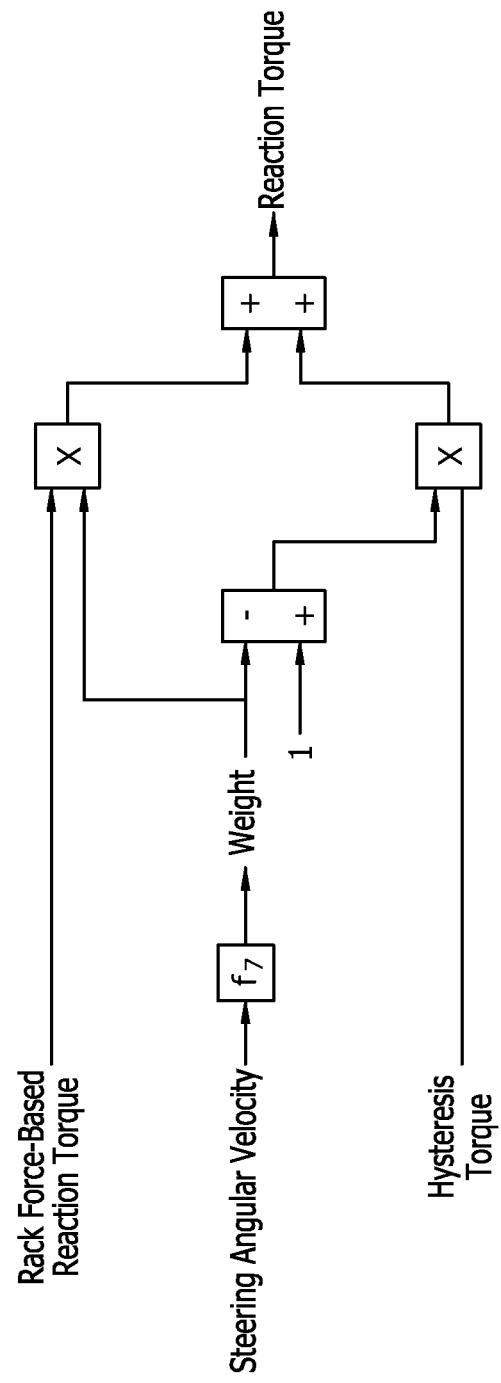
FIG. 10 is a diagram for describing a weight table of the reaction torque generator in accordance with the embodiment of the present disclosure.

FIG. 10 is a diagram for describing the weight table of the reaction torque generator in accordance with the embodiment of the present disclosure.

Referring to FIG. 10, a weight according to a steering angular velocity may be stored in the form of a predetermined equation or table. Thus, the weight is decided based on the steering angular velocity. The decided weight is multiplied by rack force-based reaction torque, and (1-weight) is multiplied by the hysteresis torque. The two values calculated in such a manner are added to calculate the reaction torque.

The calculated reaction torque may be utilized as a control parameter which is used in the apparatus for controlling a steer-by-wire system as described above.

In the steer-by-wire steering system, a reaction force device and a front wheel steering device are separated from each other, such that a steering shaft and a pinion shaft are not mechanically connected to each other. Thus, since a driver may turn a steering wheel infinitely, the turn of the steering wheel needs to be stopped at a random angle.

Thus, when the steering angle reaches an end stop of the steering wheel, the end-lock torque detector 180 sets end-lock torque based on the steering angle, and controls a motor to follow the end-lock torque.

That is, the end-lock torque detector 180 supplies the motor with the end-lock torque according to the steering angle at the end stop of the steering wheel (for example, −360° and 360° when the steering wheel is turned from −360° to 360°), and thus interrupts the turn of the steering wheel such that the driver can recognize the end stop of the steering wheel.

Thus, the end-lock torque detector 180 may prevent the driver from operating the steering wheel beyond the end stop of the steering wheel, thereby preventing noise and vibration caused by a collision between a rack bar and another mechanism at an end stop of rack stroke, and improving the lifetime of the vehicle.

Furthermore, in the steer-by-wire steering system, the reaction force device and the front wheel steering device are separated from each other, such that the steering shaft and the pinion shaft are not mechanically connected to each other. Thus, when the vehicle bumps against a curb, the rack bar does not move even though the rack bar is not positioned at the end stop. Thus, the turn of the steering wheel needs to be stopped.

Thus, when the vehicle bumps against the curb, the end-lock torque detector 180 sets end-lock torque based on a rack force estimation value, and controls the motor to follow the end-lock torque.

That is, when a difference between the steering angle and a pinion angle is equal to or more than a preset angle, the end-lock torque detector 180 determines that the vehicle has bumped against the curb, sets the end-lock torque based on the rack force estimation value, and controls the motor to follow the end-lock torque.

As described above, when the steering angle reaches the end stop of the steering wheel or the difference between the steering angle and the pinion angle is equal to or more than a preset angle, the end-lock torque detector 180 may set end-lock torque according to the steering angle or the rack force estimation value, and control the motor to follow the end-lock torque.

Figure 11:
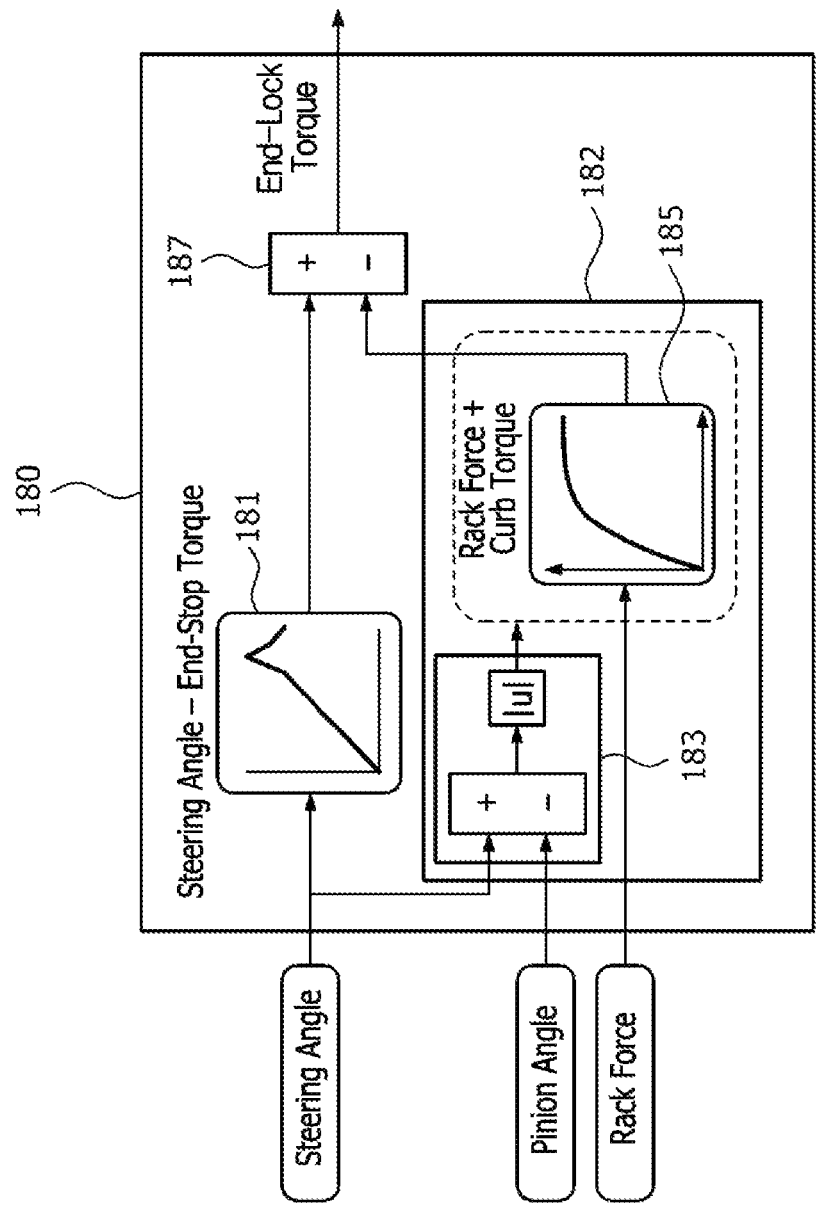
FIG. 11 is a block configuration diagram illustrating an end-lock torque detector in accordance with the embodiment of the present disclosure.

FIG. 11 is a block configuration diagram illustrating the end-lock torque detector in accordance with the embodiment of the present disclosure.

The end-lock torque detector 180 includes an end stop processing unit 181, a curb processing unit 182 and an end-lock torque setting unit 187.

The end stop processing unit 181 receives the steering angle of the steering wheel, and acquires torque according to the steering angle from an end-stop torque map, when the steering angle reaches the end stop.

At this time, the end-stop torque map may be a table in which torque is previously set according to each steering angle as shown in Table 1 below.

TABLE 1

| Steering angle [deg] | 0 | 5 | ... | T.B.D[deg] |
|---|---|---|---|---|
| Torque[Nm] | 0 | ... | ... | T.B.D[Nm] |

The curb processing unit 182 receives the steering angle, the pinion angle and the rack force estimation value, and acquires torque according to the rack force estimation value from a curb torque map, when the difference between the steering angle and the pinion angle is equal to or more than the preset angle. At this time, the curb processing unit 182 may receive the pinion angle and the rack force estimation value, which are received through a communication line (for example, Direct CAN) of the steer-by-wire steering system.

The curb processing unit 182 may include a calculation part 183 and a curb torque acquisition part 185.

The calculation part 183 calculates a difference between the steering angle and the pinion angle, and determines whether the calculated difference is equal to or more than the preset angle.

When the difference between the steering angle and the pinion angle is equal to or more than the preset angle, the curb torque acquisition part 184 may determine that the vehicle has bumped against the curb, and acquire torque according to the rack force estimation value from the cur torque map.

At this time, the curb torque map may be a table in which torque is previously set according to each rack force estimation value as shown in Table 2 below.

TABLE 2

| Rack force [N] | T.B.D | ... | T.B.D[deg] |
|---|---|---|---|
| Torque [Nm] | 0 | ... | T.B.D[Nm] |

The end-lock torque setting unit 187 sets the torque, acquired by the end stop processing unit 181 or the curb processing unit 182, as the end-lock torque.

The damping torque detector 200 detects damping torque using the vehicle speed detected by the vehicle speed detector 110, the steering angle detected by the steering angle detector 120, and the steering angular velocity detected by the steering angular velocity detector 130. Here, it is obvious to those skilled in the art that the damping torque detector 200 detects the damping torque using the vehicle speed, the steering angle and the steering angular velocity. Thus, the detailed descriptions thereof will be omitted herein. The method for detecting damping torque is not specifically limited.

Figure 12:
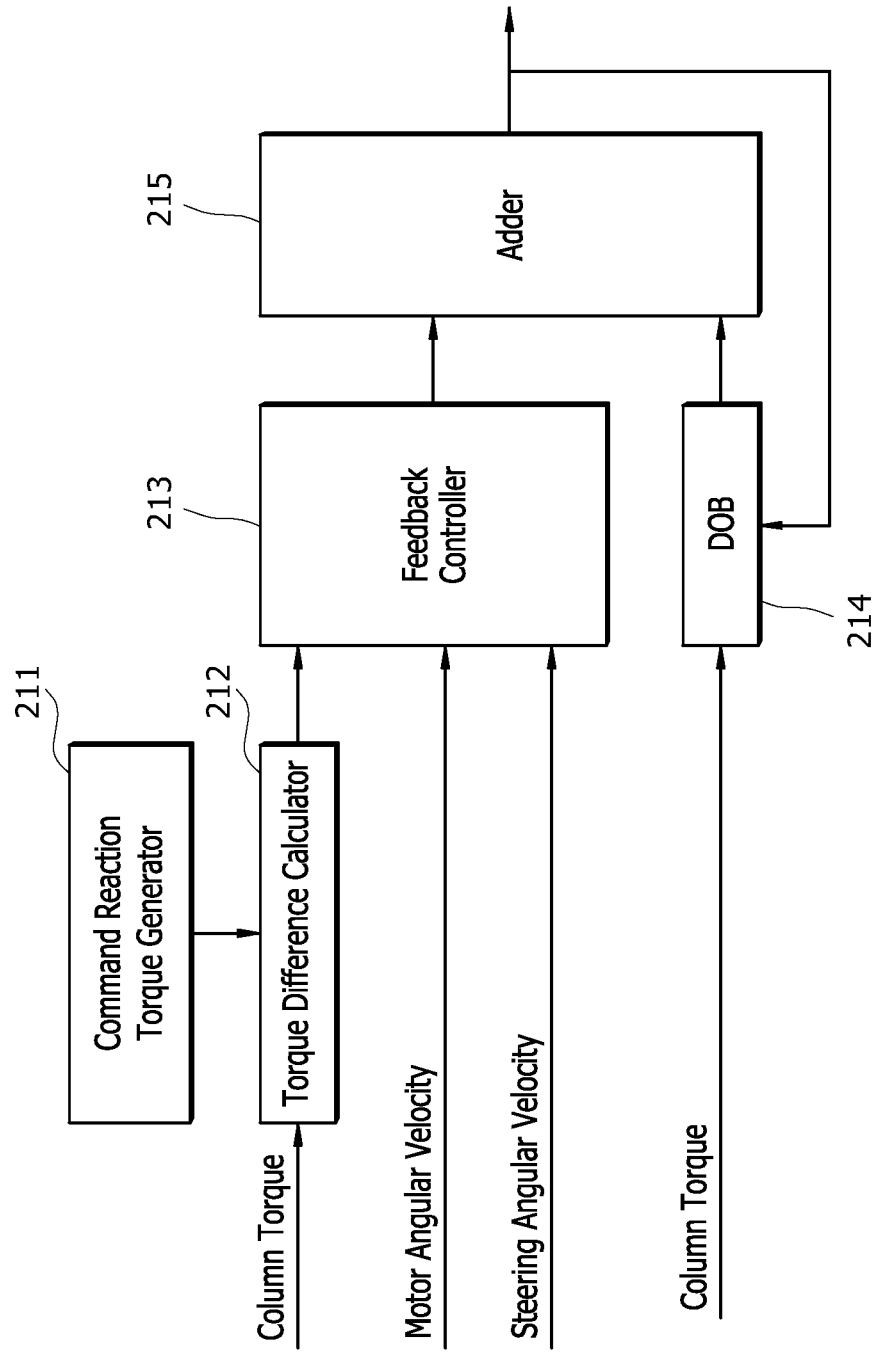
FIG. 12 is a block configuration diagram illustrating a target current generator in accordance with the embodiment of the present disclosure.
Figure 13:
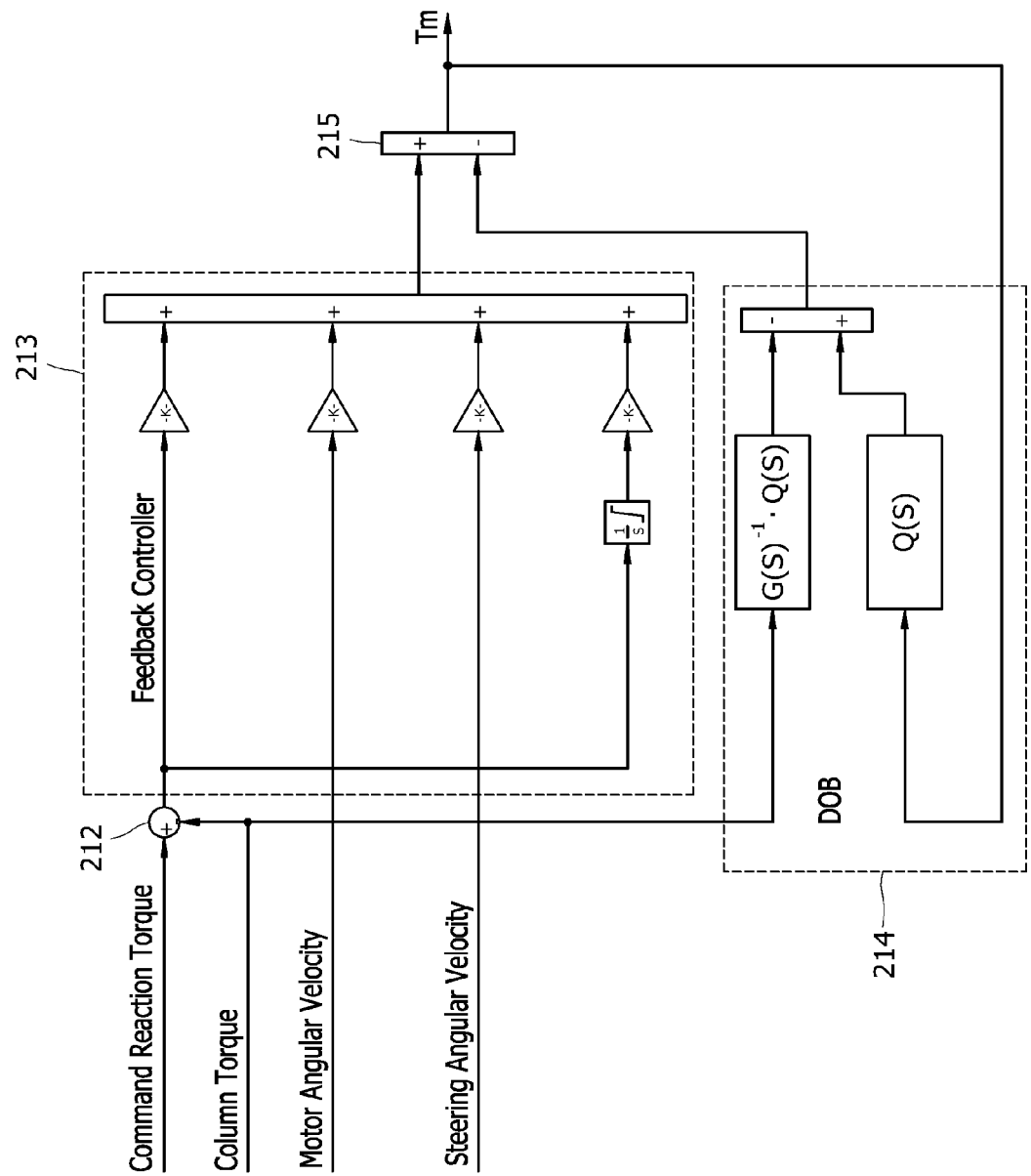
FIG. 13 is a block configuration diagram illustrating a feedback controller and a DOB (Disturbance OBserver) of the target current generator in accordance with the embodiment of the present disclosure in more detail.

FIG. 12 is a block configuration diagram illustrating the target current generator in accordance with the embodiment of the present disclosure, and FIG. 13 is a block configuration diagram illustrating a feedback controller and a DOB (Disturbance OBserver) of the target current generator in accordance with the embodiment of the present disclosure in more detail.

The target current generator 210 may generate a target current for motor control by using the final active return torque and the final reaction torque, which are inputted from the torque adjuster 160, the end-lock torque inputted from the end-lock torque detector 180, and the damping torque inputted from the damping torque detector 200, and input the generated target current to the motor.

In some embodiments, the target current generator 210 may be configured to generate the target current for motor control by using only some of the final active return torque, the final reaction torque, the end-lock torque and the damping torque, which have been described above.

In another embodiment, the target current generator 210 may be configured to generate the target current for motor control by using an additional control factor as well as the above-described control factors.

Referring to FIGS. 12 and 13, the target current generator 210 includes a command reaction torque generator 211, a torque difference calculator 212, a feedback controller 213, a DOB (Disturbance OBserver) 214 and an adder 215.

The command reaction torque generator 211 generates command reaction torque by combining the final active return torque, the final reaction torque, the end-lock torque and the damping torque.

The torque difference calculator 212 may subtract column torque from the command reaction torque, and output the resultant value as reaction torque.

The feedback controller 213 may generate compensation reaction torque by compensating for torque by a steering mechanism, based on the reaction torque outputted from the torque difference calculator 212, a motor angular velocity and a steering angular velocity.

As illustrated in FIG. 13, the feedback controller 213 may generate the compensation reaction torque by adding values, obtained by reflecting a predefined gain k into the reaction torque outputted from the torque difference calculator 212, the motor angular velocity and the steering angular velocity, to a value, obtained by reflecting the predefined gain k into a value obtained by integrating the reaction torque, thereby acquiring a stable phase margin and a high response speed.

The DOB 214 may receive the column torque and motor input reaction torque, and generate a disturbance compensation value by estimating disturbance.

The DOB 214 may generate the disturbance compensation value by adding a value, obtained by applying a Q-filter Q(s) to the received motor input reaction torque, to a value, obtained by applying an inverse transfer filter $G(s)^{-1}$ calculated through a steering mechanism and the Q-filter to the received column torque.

That is, the DOB 214 may compensate for the reaction torque inputted to the motor under the supposition that a mechanical assembly error and mechanism efficiency are disturbances. At this time, the Q-filter may have a specific degree.

The adder 215 may apply the compensation reaction torque generated by the feedback controller 213 and the disturbance compensation value generated by the DOB 214, and output motor input reaction torque as the motor torque of a driving motor.

In the present embodiment, the target current generator 210 may derive column torque Tc using a worm gear and torsion bar which are steering mechanisms.

Figure 14:
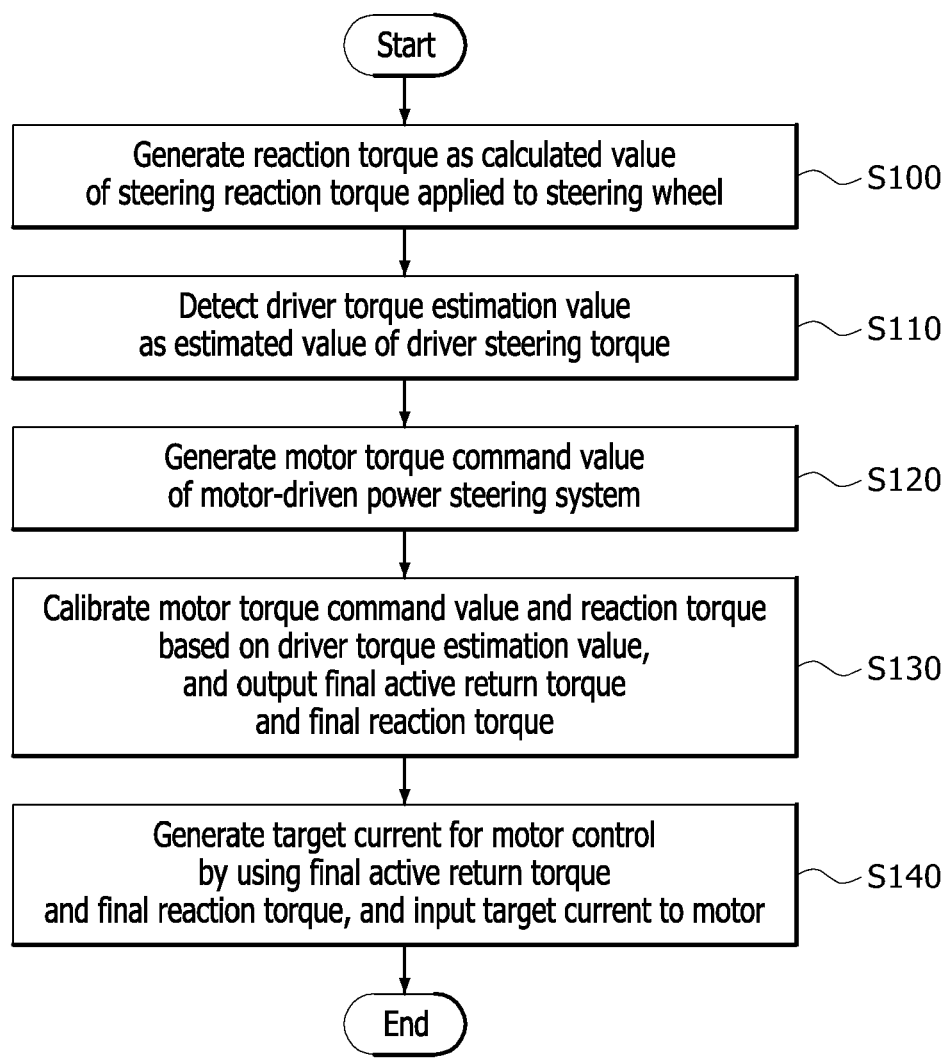
FIG. 14 is a flowchart for describing a method for controlling a steer-by-wire system in accordance with an embodiment of the present disclosure.
Figure 15:
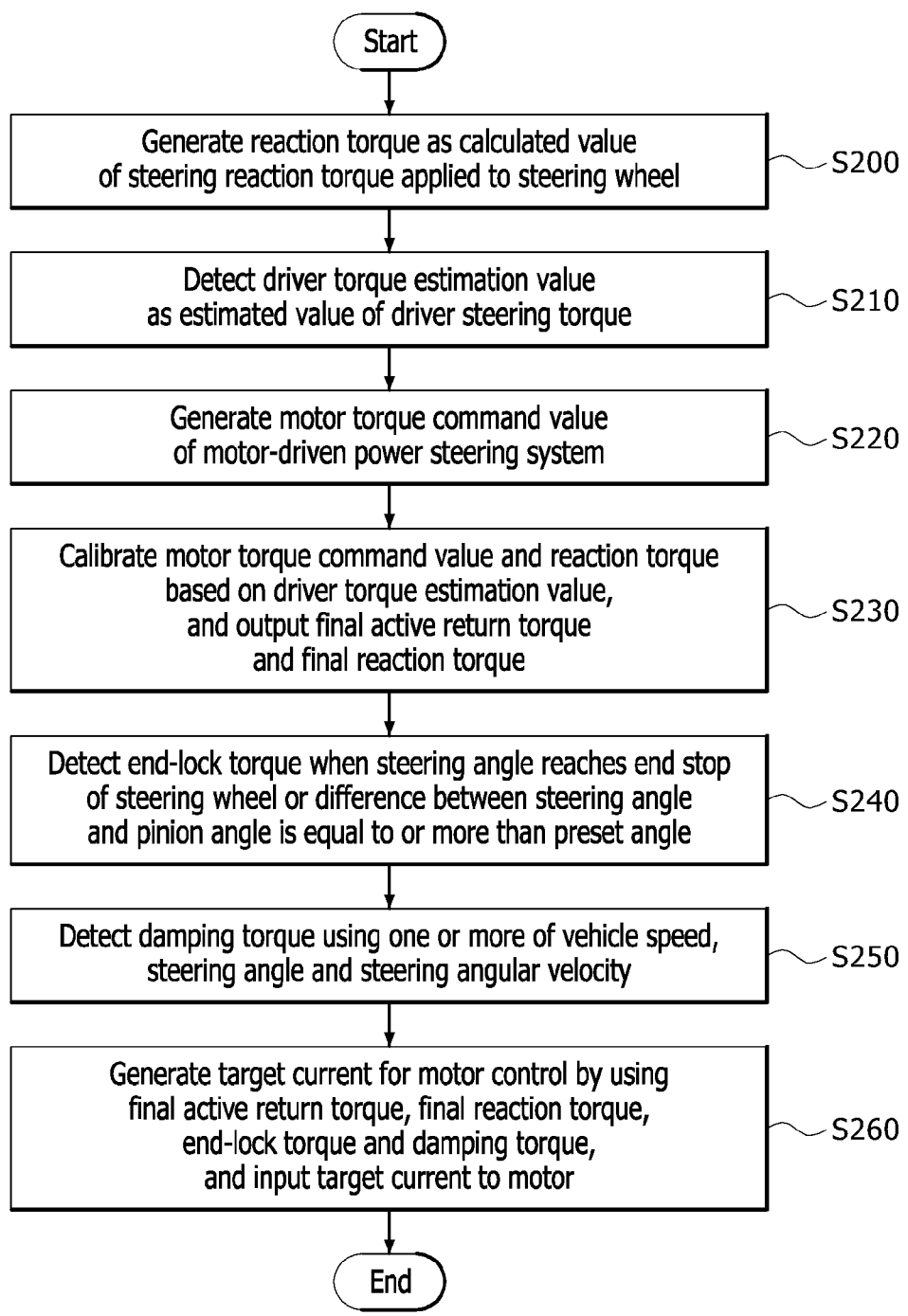
FIG. 15 is another flowchart for describing the method for controlling a steer-by-wire system in accordance with the embodiment of the present disclosure.

FIG. 14 is a flowchart for describing a method for controlling a steer-by-wire system in accordance with an embodiment of the present disclosure, and FIG. 15 is another flowchart for describing the method for controlling a steer-by-wire system in accordance with the embodiment of the present disclosure.

As illustrated in FIG. 14, the method for controlling a steer-by-wire system in accordance with some embodiments of the present disclosure may include step S100 of generating reaction torque as a calculated value of steering reaction torque applied to a steering wheel, step S110 of estimating a rack force applied to a rack bar of a motor-driven power steering system, step S120 of generating a motor torque command value of the motor-driven power steering system, step S130 of calibrating the motor torque command value and the reaction torque based on the rack force estimation value, and outputting the calibrated values as final active return torque and final reaction torque, respectively, and step S140 of generating a target current for motor control by using the final active return torque and the final reaction torque, and inputting the generated target current to a motor.

As illustrated in FIG. 15, the method for controlling a steer-by-wire system in accordance with some embodiments of the present disclosure may further include step S240 of detecting end-lock torque when a steering angle reaches an end stop of the steering wheel or a difference between the steering angle and a pinion angle is equal to or more than a preset angle, and step S250 of detecting damping torque by using one or more of the vehicle speed, the steering angle and a steering angular velocity. In this case, the method may include step S260 of generating the target current for motor control by further considering the end-lock torque and the damping torque in addition to the final active return torque and the final reaction torque.

Figure 16:
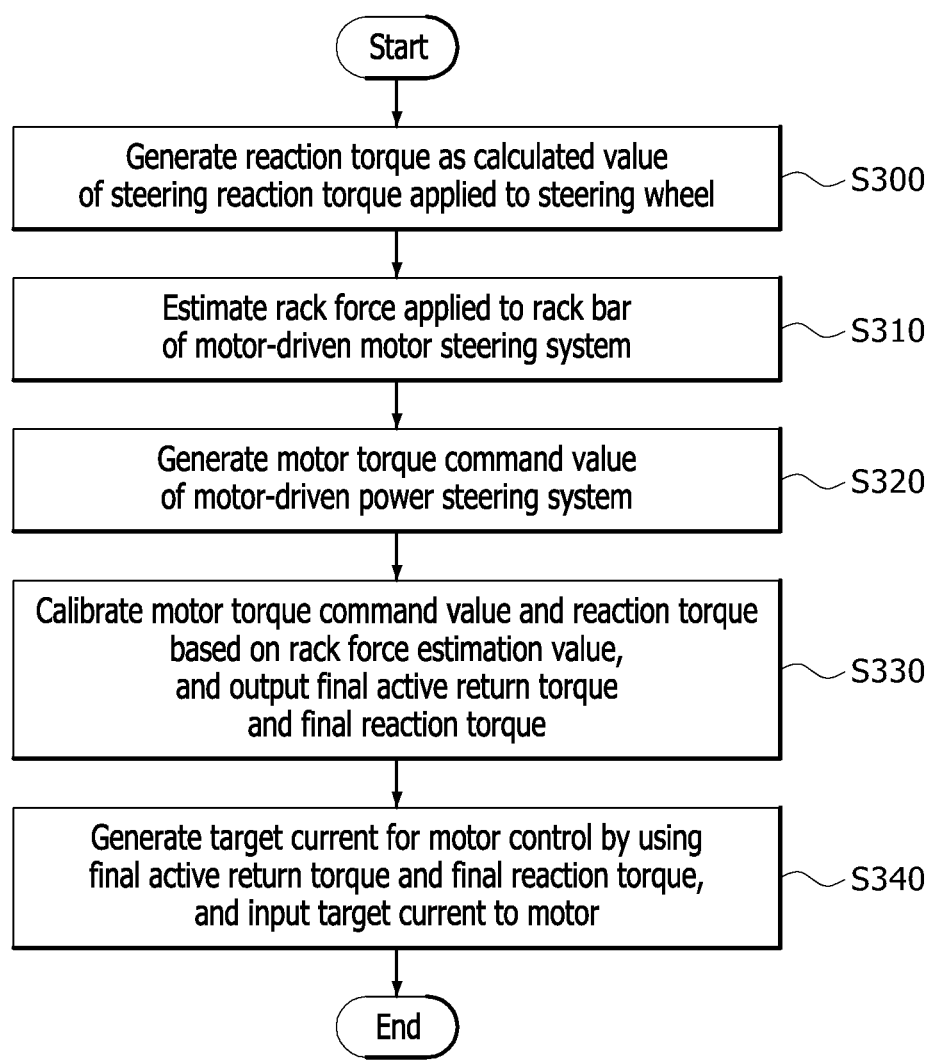
FIG. 16 is a flowchart for describing a method for controlling a steer-by-wire system in accordance with another embodiment of the present disclosure.
Figure 17:
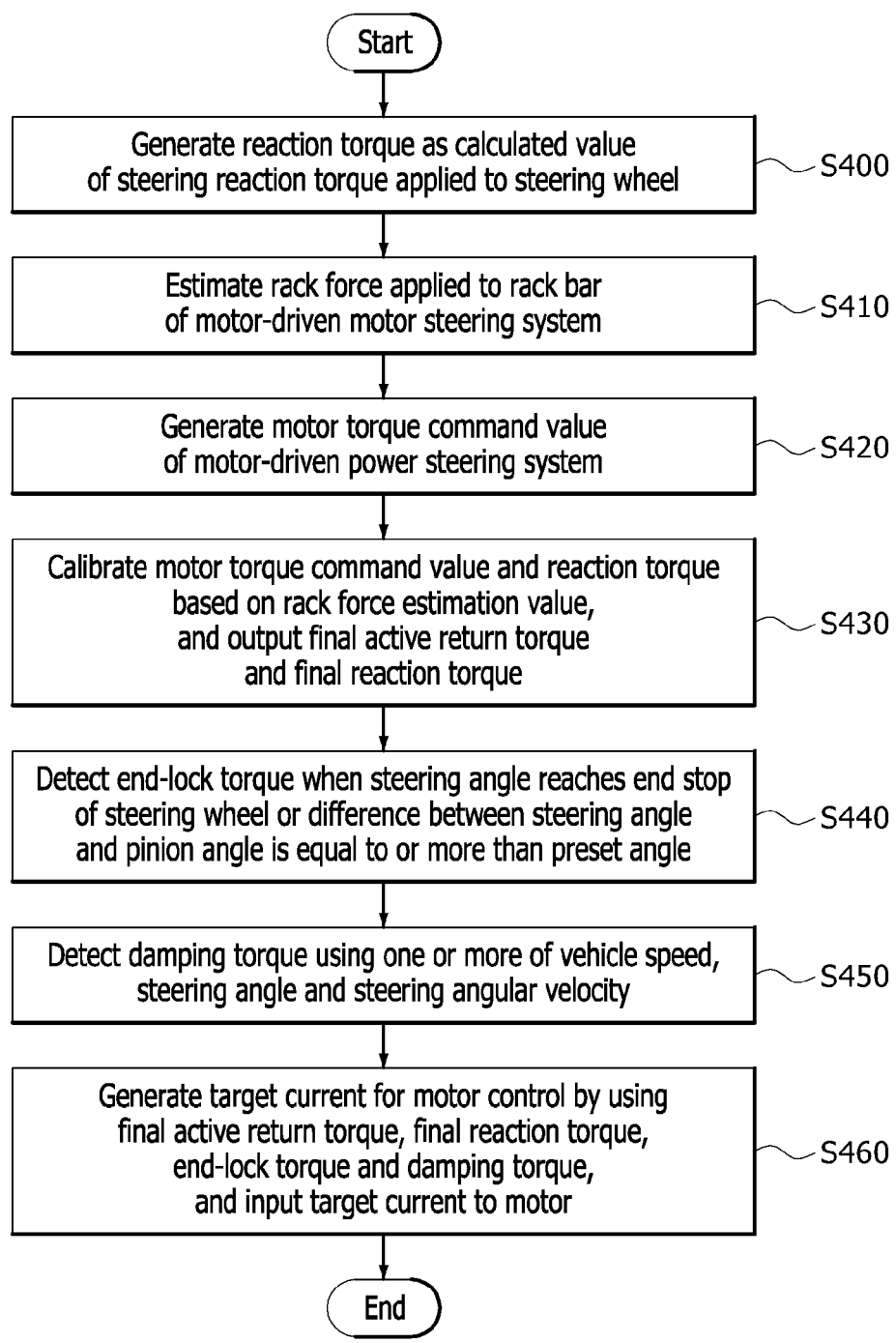
FIG. 17 is another flowchart for describing the method for controlling a steer-by-wire system in accordance with another embodiment of the present disclosure.

FIG. 16 is a flowchart for describing a method for controlling a steer-by-wire system in accordance with another embodiment of the present disclosure, and FIG. 17 is another flowchart for describing the method for controlling a steer-by-wire system in accordance with the another embodiment of the present disclosure.

As illustrated in FIG. 16, the method for controlling a steer-by-wire system in accordance with some embodiments of the present disclosure may include step S300 of generating reaction torque as a calculated value of steering reaction torque applied to a steering wheel, step S310 of estimating a rack force applied to a rack bar of a motor-driven power steering system, step S320 of generating a motor torque command value of the motor-driven power steering system, step S330 of calibrating the motor torque command value and the reaction torque based on the rack force estimation value, and outputting the calibrated values as final active return torque and final reaction torque, respectively, and step S340 of generating a target current for motor control by using the final active return torque and the final reaction torque, and inputting the generated target current to a motor.

As illustrated in FIG. 17, the method for controlling a steer-by-wire system in accordance with some embodiments of the present disclosure may further include step S440 of detecting end-lock torque when a steering angle reaches an end stop of the steering wheel or a difference between the steering angle and a pinion angle is equal to or more than a preset angle, and step S450 of detecting damping torque by using one or more of the vehicle speed, the steering angle and a steering angular velocity. In this case, the method may include step S460 of generating the target current for motor control by further considering the end-lock torque and the damping torque in addition to the final active return torque and the final reaction torque.

The details of the respective steps included in the method for controlling a steer-by-wire system in accordance with the present disclosure may be understood with reference to the above-described operations of the apparatus for controlling a steer-by-wire system.

As described above, the apparatus and method for controlling a steer-by-wire system in accordance with the embodiments of the present disclosure can compensate for the reaction torque by reflecting the column torque by a steering mechanism into the generated command reaction torque, when the steering mechanism is present in a steer-by-wire steering system which steers a vehicle by driving a steering motor connected to a rack bar based on a vehicle speed and steering angle, and drives a reaction motor to generate a reaction force to the steering wheel. Thus, the apparatus and method can compensate for an undesired steering feel generated by mechanical connection, thereby improving a driver's steering feel.

Furthermore, the apparatus and method can estimate the driver torque or rack force, and control active return of the steer-by-wire system by using the estimated driver torque or rack force, thereby improving a driver's steering feel.

Furthermore, the apparatus and method can perform active return control even without a torque sensor or torsion bar, thereby reducing the manufacturing cost of the steer-by-wire system.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling a steer-by-wire system, comprising:
a reaction torque generator configured to generate reaction torque as a calculated value of steering reaction torque applied to a steering wheel;
a driver torque estimator configured to detect a driver torque estimation value as an estimated value of driver steering torque;
a speed controller configured to generate a motor torque command value of a motor-driven power steering system;
a torque adjuster configured to calibrate the motor torque command value and the reaction torque based on the driver torque estimation value, and output final active return torque and final reaction torque; and
a target current generator configured to generate a target current for motor control by using the final active return torque and the final reaction torque, inputted from the torque adjuster, and input the generated target current to a motor.

2. The apparatus of claim 1, wherein the reaction torque generator generates the reaction torque by adding hysteresis torque based on a steering angular velocity of a steering wheel to reaction torque based on a rack force.

3. The apparatus of claim 2, wherein the reaction torque generator comprises:
a reaction torque decision unit configured to decide the reaction torque based on the rack force, based on a vehicle speed and a rack force estimation value of a steering system;
a hysteresis torque decision unit configured to decide the hysteresis torque based on the steering angular velocity of the steering wheel; and a weight application unit configured to calculate the reaction torque by applying a weight to the reaction torque based on the rack force and the hysteresis torque.

4. The apparatus of claim 3, wherein the hysteresis torque decision unit decides the hysteresis torque using a model which decides a hysteresis torque value based on the steering angular velocity.

5. The apparatus of claim 4, wherein the hysteresis torque decision unit determines the model in consideration of the vehicle speed.

6. The apparatus of claim 3, wherein the weight application unit determines a weight between the reaction torque based on the rack force and the hysteresis torque, according to the steering angular velocity.

7. The apparatus of claim 1, further comprising an end-lock torque detector configured to detect end-lock torque whenever the steering angle reaches an end stop of a steering wheel or a difference between the steering angle and a pinion angle is equal to or greater than a preset angle,
wherein the target current generator generates the target current for motor control by further using the end-lock torque.

8. The apparatus of claim 7, wherein the end-lock torque detector detects the end-lock torque based on the steering angle or the rack force estimation value.

9. The apparatus of claim 8, wherein the end-lock torque detector comprises:
an end stop processing unit configured to acquire torque based on the steering angle from an end-stop torque map whenever the steering angle reaches the end stop of the steering wheel;
a curb processing unit configured to acquire torque based on the rack estimation value from a curb torque map whenever the difference between the steering angle and the pinion angle is equal to or greater than the preset angle; and
an end-lock torque setting unit configured to set the torque, acquired by the end stop processing unit or the curb processing unit, as the end-lock torque.

10. The apparatus of claim 1, further comprising a damping torque detector configured to detect damping torque using one or more of the vehicle speed, the steering angle, and the steering angular velocity,
wherein the target current generator generates the target current for motor control by further using the damping torque.

11. An apparatus for controlling a steer-by-wire system, comprising:
a reaction torque generator configured to generate reaction torque as a calculated value of steering reaction torque applied to a steering wheel;
a rack force estimator configured to estimate a rack force applied to a rack bar of a motor-driven motor steering system;
a speed controller configured to generate a motor torque command value of the motor-driven power steering system;
a torque adjuster configured to calibrate the motor torque command value and the reaction torque based on the rack force estimation value, and output final active return torque and final reaction torque; and
a target current generator configured to generate a target current for motor control by using the final active return torque and the final reaction torque, inputted from the torque adjuster, and input the generated target current to a motor.

12. The apparatus of claim 11, wherein the reaction torque generator generates the reaction torque by adding hysteresis torque based on a steering angular velocity of a steering wheel to reaction torque based on a rack force.

13. The apparatus of claim 12, wherein the reaction torque generator comprises:
a reaction torque decision unit configured to decide the reaction torque based on the rack force, based on a vehicle speed and a rack force estimation value of a steering system;
a hysteresis torque decision unit configured to decide the hysteresis torque based on the steering angular velocity of the steering wheel; and
a weight application unit configured to calculate the reaction torque by applying a weight to the reaction torque based on the rack force and the hysteresis torque.

14. The apparatus of claim 13, wherein the hysteresis torque decision unit decides the hysteresis torque using a model which decides a hysteresis torque value based on the steering angular velocity.

15. The apparatus of claim 13, wherein the weight application unit determines a weight between the reaction torque based on the rack force and the hysteresis torque, according to the steering angular velocity.

16. The apparatus of claim 11, further comprising an end-lock torque detector configured to detect end-lock torque whenever the steering angle reaches an end stop of a steering wheel or a difference between the steering angle and a pinion angle is equal to or greater than a preset angle,
wherein the target current generator generates the target current for motor control by further using the end-lock torque.

17. The apparatus of claim 16, wherein the end-lock torque detector detects the end-lock torque based on the steering angle or the rack force estimation value.

18. The apparatus of claim 17, wherein the end-lock torque detector comprises:
an end stop processing unit configured to acquire torque based on the steering angle from an end-stop torque map whenever the steering angle reaches the end stop of the steering wheel;
a curb processing unit configured to acquire torque based on the rack estimation value from a curb torque map whenever the difference between the steering angle and the pinion angle is equal to or greater than the preset angle; and
an end-lock torque setting unit configured to set the torque, acquired by the end stop processing unit or the curb processing unit, as the end-lock torque.

19. The apparatus of claim 11, further comprising a damping torque detector configured to detect damping torque using one or more of the vehicle speed, the steering angle, and the steering angular velocity,
wherein the target current generator generates the target current for motor control by further using the damping torque.

20. A method for controlling a steer-by-wire system, comprising:
generating reaction torque as a calculated value of steering reaction torque applied to a steering wheel;
detecting a driver torque estimation value as an estimated value of driver steering torque, or estimating a rack force applied to a rack bar of a motor-driven power steering system;
generating a motor torque command value of the motor-driven power steering system;

calibrating the motor torque command value and the reaction torque based on the driver torque estimation value or the rack force estimation value, and outputting final active return torque and final reaction torque; and generating a target current for motor control by using the final active return torque and the final reaction torque, and inputting the generated target current to a motor.

\* \* \* \* \*